(12) United States Patent
Zhang

(10) Patent No.: US 9,440,423 B2
(45) Date of Patent: Sep. 13, 2016

(54) VACUUM LAMINATION MACHINE SUITABLE FOR ALL GENERATIONS AND OPERATION METHOD THEREOF

(71) Applicant: Shenzhen China Star Optoelectronics Technology Co., Ltd., Shenzhen, Guangdong Province (CN)

(72) Inventor: Xindi Zhang, Shenzhen (CN)

(73) Assignee: SHENZHEN CHINA STAR OPTOELECTRONICS TECHNOLOGY CO., LTD., Shenzhen, Guangdong Province (CN)

( * ) Notice: Subject to any disclaimer, the term of this patent is extended or adjusted under 35 U.S.C. 154(b) by 0 days.

(21) Appl. No.: 15/062,194

(22) Filed: Mar. 6, 2016

(65) Prior Publication Data

US 2016/0185096 A1    Jun. 30, 2016

Related U.S. Application Data

(63) Continuation of application No. 13/579,034, filed on Aug. 15, 2012, now Pat. No. 9,375,909.

(30) Foreign Application Priority Data

Jun. 1, 2012   (CN) .......................... 2012 1 0177938

(51) Int. Cl.
    *B32B 41/00*      (2006.01)
    *B32B 37/10*      (2006.01)
    *B32B 37/12*      (2006.01)

(52) U.S. Cl.
    CPC ........... *B32B 41/00* (2013.01); *B32B 37/1018* (2013.01); *B32B 37/1284* (2013.01); *B32B 2309/10* (2013.01); *B32B 2457/202* (2013.01)

(58) Field of Classification Search
    CPC .............. B32B 37/10; B32B 37/1009; B32B 37/1018; B32B 37/12; B32B 38/18; B32B 39/00; B32B 41/00; B32B 2041/01; B32B 2309/08; B32B 2309/10; B32B 2309/68; B32B 2457/202; B32B 2457/204; B32B 2457/206; B32B 2457/208; G02F 1/1303; G02F 2001/133322; G02F 2001/13354; B25J 15/08; B25J 21/005
    USPC ............ 156/64, 360, 367, 368, 378; 294/32, 294/213, 902; 414/941
    See application file for complete search history.

(56) References Cited

U.S. PATENT DOCUMENTS

| 5,833,288 A | * | 11/1998 | Itasaka | ................ | H01L 21/6838 294/186 |
| 2003/0159769 A1 | * | 8/2003 | Ogimoto | ............. | B32B 38/1841 156/64 |
| 2008/0283359 A1 | * | 11/2008 | Wen | ..................... | B65G 49/067 198/403 |

FOREIGN PATENT DOCUMENTS

| CN | 102039713 A | * | 5/2011 |
| CN | 202192834 U | * | 4/2012 |

*Primary Examiner* — George Koch
(74) *Attorney, Agent, or Firm* — Cheng-Ju Chiang

(57) ABSTRACT

A vacuum lamination machine suitable for all generations is disclosed. The vacuum lamination machine includes a stage on which a transfer device, a positioning device, an adhesive application device, a turn-over device, and at least one vacuum lamination device are arranged. The stage has a size that is sufficiently large for all sizes of substrate. The transfer device includes a fork that is adjustable for spacing distance to suit for substrate sizes. The turn-over device includes sufficiently densely arranged vacuum suction pins to suit for substrate sizes. The positioning device includes a size identification system that identifies a rough location of a substrate on the stage and a mark position identification system that carries out precise alignment of the substrate.

4 Claims, 3 Drawing Sheets

VACUUM LAMINATION MACHINE SUITABLE FOR ALL GENERATIONS AND OPERATION METHOD THEREOF

CROSS REFERENCE TO RELATED APPLICATIONS

This is a continuation of patent application Ser. No. 13/579,034 "Vacuum Lamination Machine Suitable for All Generations and Operation Method Thereof", filed on Aug. 15, 2012, now U.S. Pat. No. 9,375,909 which is a 35 U.S.C. §371 National Phase conversion of International (PCT) Patent Application No. PCT/CN2012/076615, filed on Jun. 8, 2012, and claims benefit of Chinese Patent Application No. 201210177938.1, filed on Jun. 1, 2012, the disclosure of which is incorporated by reference herein.

BACKGROUND OF THE INVENTION

1. Field of the Invention

The present invention relates to the technical field of liquid crystal manufacture, and in particular to a vacuum lamination machine suitable for all generations and an operation method thereof.

2. The Related Arts

In the cell process of LCD (Liquid Crystal Display), lamination of a TFT (Thin Film Transistor) substrate and a CF (Color Filter) substrate must be carried out in a vacuum environment and a vacuum lamination machine is used. The stage of the vacuum lamination machine is of different size for manufacture line of different generation. The conventional vacuum lamination machine only suits for a specific generation and cannot be used between different generations, especially for experiment manufacture lines, making it insufficiently flexible.

Taking Chinese Patent Application No. 200910178174.6 as an example, the conventional vacuum lamination machine generally comprises, on a stage, a transfer device, a positioning device, an adhesive application device, a turn-over device, and at least one vacuum lamination device. The transfer device is set at one side of the stage for picking and placing substrates from the positioning device, the adhesive application device, the turn-over device, and the vacuum lamination device that are located at an opposite side of the stage. The positioning device holds a substrate to be laminated and position and hold a laminated substrate. The adhesive application device operates an adhesive applicator to apply lamination adhesive to a substrate that is transferred by the transfer device from the positioning device. The turn-over device operates a turn-over machine to turn over a substrate that is transferred by the transfer device from the adhesive application device. The vacuum lamination device holds, by suction or adhesion, an adhesive-applied substrate and a non-adhesive-applied substrate that are transferred in by the transfer device in a vertical opposing manner and carries out lamination of the substrates in a vacuum environment.

The conventional vacuum lamination machine is subjected to limitation of the size of stage. A specific size of stage is only operable for laminating substrates of a corresponding size. For a mass production manufacture line, once the size of the substrate has been determined, lamination can only be performed on substrates of such a size. This saves the purchase expenditure of stages. For an experiment manufacture line, it often needs to laminate substrates of different sizes. The known designs of vacuum lamination machine available in the market make it necessary to purchases several stages in order to suit such a need.

SUMMARY OF THE INVENTION

Thus, an object of the present invention is to provide a vacuum lamination machine suitable for all generations and supporting substrate pairs of various sizes thereby improving flexibility of use of stage.

Another object of the present invention is to provide an operation method for a vacuum lamination machine suitable for all generations that supports substrate pairs of various sizes and improves flexibility of use of stage.

To achieve the objects, the present invention provides a vacuum lamination machine suitable for all generations, which comprises a stage on which a transfer device, a positioning device, an adhesive application device, a turn-over device, and at least one vacuum lamination device are arranged. The stage has a size that is sufficiently large for all sizes of substrate. The transfer device comprises a fork that is adjustable for spacing distance to suit for substrate sizes. The turn-over device comprises sufficiently densely arranged vacuum suction pins to suit for substrate sizes. The positioning device comprises a size identification system that identifies a rough location of a substrate on the stage and a mark position identification system that carries out precise alignment of the substrate.

Wherein, the turn-over device controls intensity of air flow of the vacuum suction pins.

Wherein, the size of the stage suits for substrate size of generation 10 or greater than generation 10.

Wherein, the size identification system comprises an interface for an operator to manually enter the substrate size and a detector arranged on the stage for automatically identifying a right-angle and borderlines of a substrate, whereby after the operator manually enters the substrate size, the size identification system generates a simulation frame having a size corresponding to the entered substrate size on a control screen, the detector automatically detecting a right-angle and borderlines of the substrate on the stage, the size identification system automatically matching the simulation frame with the right-angle or borderlines of the substrate on the stage according to the right-angle or borderlines detected by the detector, location of the substrate on the stage being determined according to determination of location of the simulation frame.

Wherein, the mark position identification system comprises alignment CCD (Charge Coupling Device) and an interface that allows an operator to manually enter precise location of a mark on the substrate, the alignment CCD and the vacuum lamination device moving to the mark position according to the entered information of mark position and carrying out precise alignment for the substrate according to the mark.

The present invention also provides an operation method for a vacuum lamination machine suitable for all generations, which comprises the following steps:

Step 10: transfer device adjusting spacing distance of a fork to suit for substrate size;

Step 20: an operator manually entering substrate size and a size identification system generating a simulation frame having a size corresponding to the entered substrate size on a control screen, a detector arranged on a stage automatically detecting a right-angle and borderlines of a substrate on the stage, the size identification system automatically matching the simulation frame with the right-angle or borderlines of the substrate on the stage according to the right-angle or borderlines detected by the detector, whereby location of the substrate on the stage is determined according to determination of location of the simulation frame;

Step 30: determining a substrate zone for precise alignment through determination of relative position of the substrate and the stage, moving alignment CCD and a vacuum lamination device to the substrate zone;

Step 40: manually entering a precise location of a mark on the substrate through a mark position identification system and moving the alignment CCD and the vacuum lamination device to the mark location according to entered information of mark location and carrying out precise alignment for the substrate according to the mark; and Step 50: starting a lamination operation after precise alignment.

Wherein, the vacuum lamination machine suitable for all generations comprises a stage on which a transfer device, a positioning device, an adhesive application device, a turn-over device, and at least one vacuum lamination device are arranged, the stage having a size that is sufficiently large for all sizes of substrate, the transfer device comprising a fork that is adjustable for spacing distance to suit for substrate sizes, the turn-over device comprising sufficiently densely arranged vacuum suction pins to suit for substrate sizes, the positioning device comprising a size identification system that identifies a rough location of a substrate on the stage and a mark position identification system that carries out precise alignment of the substrate.

Wherein, the method further comprises a step of the turn-over device adjusting intensity of air flow of the vacuum suction pins.

Wherein, the substrate comprises a TFT substrate or a CF substrate.

Wherein, the size of the stage of the vacuum lamination machine suitable for all generations suits for substrate size of generation 10 or greater than generation 10.

The present invention provides a vacuum lamination machine suitable for all generations, which supports substrate pairs of various sizes and improves flexibility of use of stage. The operation method for a vacuum lamination machine suitable for all generations according to the present invention needs only one vacuum lamination machine suitable for all generations to suit for the needs of various substrate sizes, thereby reducing the purchase expenditure of stages.

BRIEF DESCRIPTION OF THE DRAWINGS

The technical solution, as well as beneficial advantages, will be apparent from the following detailed description of embodiments of the present invention, with reference to the attached drawings. In the drawings.

DETAILED DESCRIPTION OF THE PREFERRED EMBODIMENTS

Figure 1:
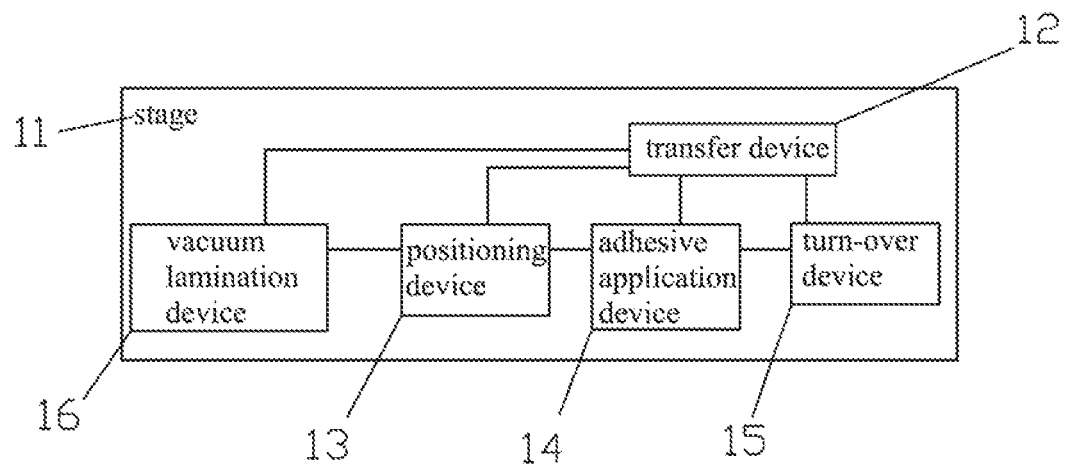
FIG. 1 is a block diagram of a preferred embodiment of a vacuum lamination machine suitable for all generations according to the present invention.

Referring to FIG. 1, which is a block diagram of a preferred embodiment of a vacuum lamination machine suitable for all generations according to the present invention, the vacuum lamination machine suitable for all generations according to the present invention is formed through modification of an existing vacuum lamination machine. Arranged on a stage 11 includes a transfer device 12, a positioning device 13, an adhesive application device 14, a turn-over device 15, and at least one vacuum lamination device 16. The stage 11 has a size that is sufficiently large for all sizes of substrate. The transfer device 12 comprises a fork that is adjustable for spacing distance to suit for substrate size. The turn-over device 15 comprises sufficiently densely arranged vacuum suction pins to suit for substrate size. The positioning device 13 comprises a size identification system that identifies a rough location of a substrate on the stage and a mark position identification system that carries out precise alignment of substrate.

With a large-sized stage being provided, the vacuum lamination machine suitable for all generations according to the present invention uses the size identification system to determine the size of a substrate and identify the position of the substrate and then uses marks to carry out precise alignment in order to assemble a TFT substrate and a CF substrate together.

The stage is made in a size of G10 or an even larger size. This is different from the existing designs of vacuum lamination machine. The stages of existing vacuum lamination machines generally correspond to the size of substrate. The present invention uses a large-sized stage is for the purpose of allowing substrates of all sizes to be positioned on the stage to carry out lamination.

Figure 2:
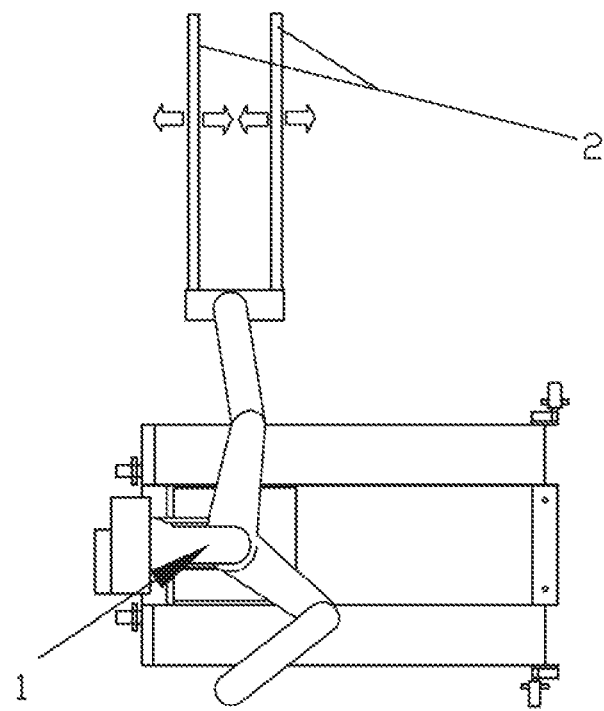
FIG. 2 is a schematic view showing structure of a transfer device of a preferred embodiment of a vacuum lamination machine suitable for all generations according to the present invention.

The transfer device that is employed in the present invention to transfer substrates is designed in an adjustable form to suit for the size of substrate. As shown in FIG. 2, which is a schematic view showing structure of a transfer device of a preferred embodiment of a vacuum lamination machine suitable for all generations according to the present invention, the transfer device 1 comprises a fork 2 that is adjustable for spacing distance. The fork is adjustable according to the directions of arrows. A regular robot transfer device is adjustable for the spacing distance of the fork in order to hold substrates of various sizes. A vacuum transfer device has a fork that is also adjustable for the spacing distance in order to hold turned-over substrates of various sizes.

Figure 3:
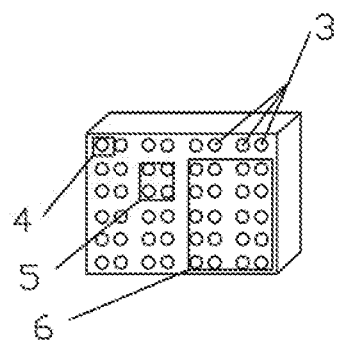
FIG. 3 is a schematic view showing structure of a vacuum suction pin of a preferred embodiment of a vacuum lamination machine suitable for all generations according to the present invention.

As shown in FIG. 3, which is a schematic view showing structure of a vacuum suction pin of a preferred embodiment of a vacuum lamination machine suitable for all generations according to the present invention, the turn-over device comprises densely distributed vacuum suction pins, because sucking a substrate requires the cooperative operation of a number of vacuum suction pins. Sparsely arranged vacuum suction pins cannot meet the need of turning over a small size substrate. The distribution density of the vacuum suction pins 3 shown in FIG. 3 provide different conditions of being incapable of satisfying, just satisfying, and fully satisfying with respect to substrates 4, 5, 6 that are of different sizes. Thus, the greater the density of the vacuum suction pins 3 is, the smaller the size of substrate that can be supported will be. The turn-over device is capable of controlling air flows through the vacuum suction pins to eliminate the situation that a loaded large size substrate cannot be properly sucked due to excessively small pressure applied, or the situation that a loaded small size substrate is broken by an excessively great force induced by air flows.

Figure 4:
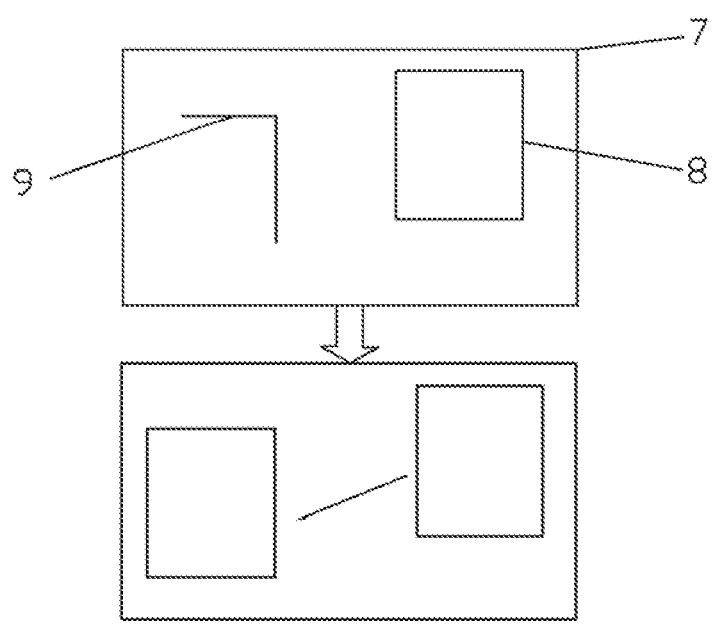
FIG. 4 is a schematic view illustrating operation of a size identification system of a preferred embodiment of a vacuum lamination machine suitable for all generations according to the present invention.

The vacuum lamination machine suitable for all generations according to the present invention comprises a size identification system of which the purpose is to identifying a rough location of a substrate on the stage. The size identification system comprises pre-programmed routine to provide an operation interface to a user. As shown in FIG. 4, which is a schematic view illustrating the operation of the size identification system of a preferred embodiment of a vacuum lamination machine suitable for all generations according to the present invention, during the operation of the size identification system, a control screen displays an operation interface, which comprises a stage simulation interface 7, a substrate simulation frame 8, and a right-angle and borderlines of a substrate captured by a detector. When the size identification system is used to identify the rough position of the substrate on the stage, an operator manually enters the size of the substrate and the size identification system generates a simulation frame 8 having a size corresponding to the substrate. The detector arranged on the stage automatically identifies a right-angle and borderlines 9 of the glass substrate, which are displayed on the operation interface. Next, as indicated by the arrow of FIG. 4, the operation interface changes, reflecting that the size identification system follows a predetermined process to match the simulation frame and the captured right-angle and borderlines. According to the right-angle and borderlines detected by the detector, the size identification system automatically matches the simulation frame and the right-angle and borderlines to determine the location of the simulation frame. The location of the simulation frame is the location of the substrate on the stage, the error being less than 10 µm.

The present invention uses a mark position identification system for precise alignment, including alignment CCD and an interface that allows an operator to manually enter precise location of a mark on the substrate. The alignment CCD and the vacuum lamination device move to the mark position according to the entered information of mark position and carry out precise alignment for the substrate according to the mark. The mark position identification system comprises a pre-programmed routine to provide an interface to a user. The user first manually enters the precise location of the mark on the substrate with a precision of 10 µm. Then, according to the entered information of location, the alignment CCD and the vacuum lamination device move to the mark position and carry out precise alignment for the substrate according to the mark.

Figure 5:
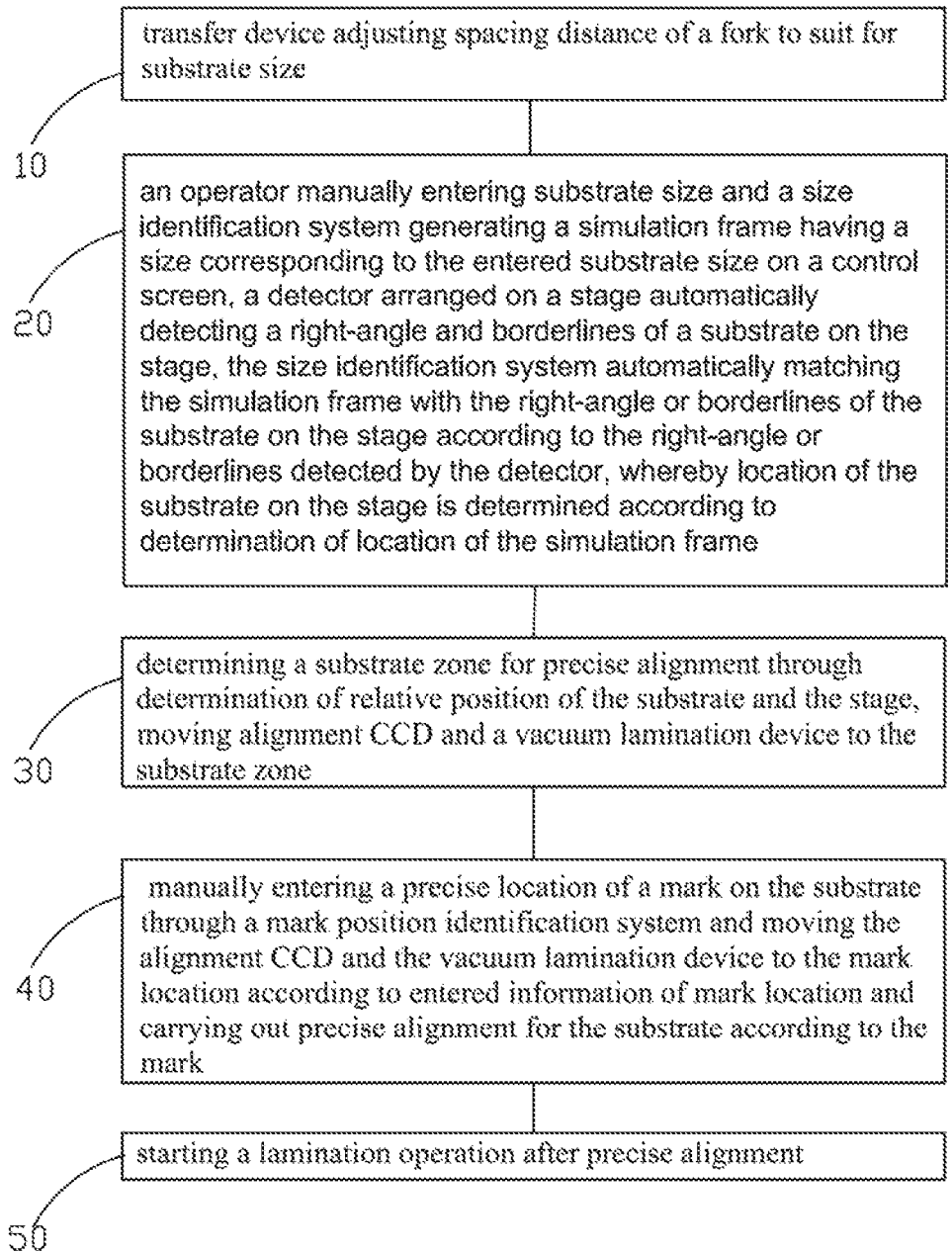
FIG. 5 is a flow chart of an operation method of a vacuum lamination machine suitable for all generations according to the present invention.

As shown in FIG. 5, which is a flow chart of an operation method of a vacuum lamination machine suitable for all generations according to the present invention, the present invention provides an operation method of a vacuum lamination machine suitable for all generations, which comprises:

Step 10: transfer device adjusting spacing distance of a fork to suit for substrate size;

Step 20: an operator manually entering substrate size and a size identification system generating a simulation frame having a size corresponding to the entered substrate size on a control screen, a detector arranged on a stage automatically detecting a right-angle and borderlines of a substrate on the stage, the size identification system automatically matching the simulation frame with the right-angle or borderlines of the substrate on the stage according to the right-angle or borderlines detected by the detector, whereby location of the substrate on the stage is determined according to determination of location of the simulation frame;

Step 30: determining a substrate zone for precise alignment through determination of relative position of the substrate and the stage, moving alignment CCD and a vacuum lamination device to the substrate zone, wherein determining the relative position of the substrate and the stage determines the substrate zone for precise alignment and the alignment CCD is a tool for the precise alignment and is moved to the substrate zone, the vacuum lamination device being a tool for lamination and being moved to the substrate zone;

Step 40: manually entering a precise location of a mark on the substrate through a mark position identification system and moving the alignment CCD and the vacuum lamination device to the mark location according to entered information of mark location and carrying out precise alignment for the substrate according to the mark; and Step 50: starting a lamination operation after precise alignment so as to assemble a TFT substrate and a CF substrate together.

The operation method of a vacuum lamination machine suitable for all generations according to the present invention is applicable to the vacuum lamination machine suitable for all generations shown in FIG. 1. Arranged on a stage 11 includes a transfer device 12, a positioning device 13, an adhesive application device 14, a turn-over device 15, and at least one vacuum lamination device 16. The stage 11 has a size that is sufficiently large for all sizes of substrate. The transfer device 12 comprises a fork that is adjustable for spacing distance to suit for substrate size. The turn-over device 15 comprises sufficiently densely arranged vacuum suction pins to suit for substrate size. The positioning device 13 comprises a size identification system that identifies a rough location of a substrate on the stage and a mark position identification system that carries out precise alignment of substrate.

Whether or not the sizes of two substrates to be laminated are standard sizes (G1-G10, each generation having a series of standard sizes) or whatever generations the two substrates belong to, if and only if the two substrates can be paired and laminated, the lamination can be carried out with the vacuum lamination machine suitable for all generations according to the present invention and the operation method thereof.

In summary, the vacuum lamination machine suitable for all generations according to the present invention can be used to assemble TFT substrates and the CF substrates of various sizes, particularly for experiment manufacture line that requires lamination of substrates of various sizes. The operation method for a vacuum lamination machine suitable for all generations according to the present invention needs only one vacuum lamination machine suitable for all generations to suit for the needs of various substrate sizes, thereby reducing the purchase expenditure of stages.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A vacuum lamination machine, comprising:

a stage on which a transfer device, a positioning device, an adhesive application device, a turn-over device, and at least one vacuum lamination device are arranged;

the stage having a size that is sufficiently large for accommodating at least two sizes of substrate to be positioned entirely thereon;

the transfer device comprising a fork that is adjustable for spacing distance to suit for the at least two substrate sizes;

the turn-over device comprising sufficiently densely arranged vacuum suction pins to suit for the at least two substrate sizes; and the positioning device comprising a size identification system that identifies a rough location of a substrate positioned on the stage and a mark position identification system that carries out precise alignment of the substrate;

wherein the size identification system is adapted to receive a substrate size entered by a user, where the substrate size corresponds to the substrate positioned on the stage, and displays a virtual simulation frame corresponding to the substrate size on a control screen that is separate from the stage on which the substrate corresponding to the substrate size entered is positioned, where the simulation frame is movable on the control screen to match a right-angle and borderlines of the substrate detected by a detector arranged on the stage and displayed on the control screen so as to identify the rough location of the substrate on the stage and confirm the size of the substrate under a condition that the substrate is not moved on the stage, while the virtual simulation frame is moved on the control screen; and wherein mark position identification system receives a precise location of a mark provided on the substrate positioned on the stage and an alignment charge coupling device (CCD) and a vacuum lamination device are moved to the mark location to carry out precise alignment of the substrate for performance of a lamination operation based on the precise alignment.

2. The vacuum lamination machine as claimed in claim 1, wherein the turn-over device controls intensity of air flow of the vacuum suction pins.

3. The vacuum lamination machine as claimed in claim 1, wherein the size identification system comprises an interface for an operator to manually enter the substrate size based on which the simulation frame is generated on the control screen.

4. The vacuum lamination machine as claimed in claim 1, wherein the mark position identification system comprises an interface that allows an operator to manually enter the precise location of the mark on the substrate.

* * * * *